Jan. 10, 1928.

W. E. WINE

SIDE BEARING

Filed March 15, 1926   2 Sheets-Sheet 1

1,655,486

Inventor:
William E. Wine,
by Parker Cook
Atty.

Jan. 10, 1928. 1,655,486
W. E. WINE
SIDE BEARING
Filed March 15, 1926 2 Sheets-Sheet 2
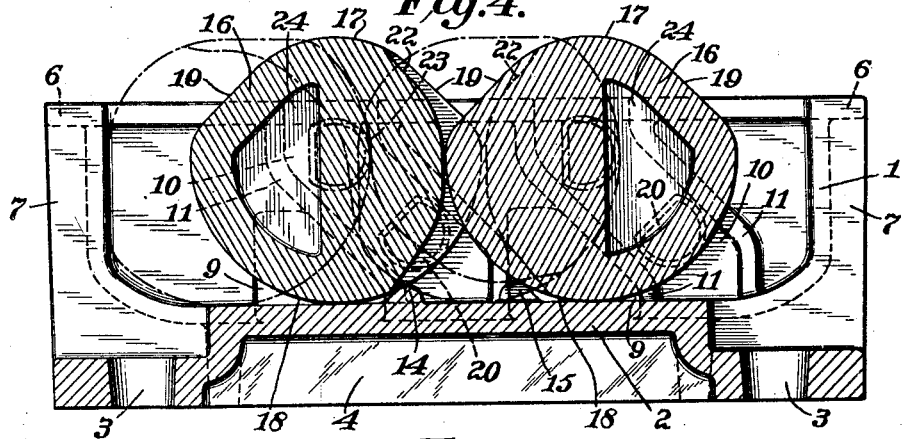
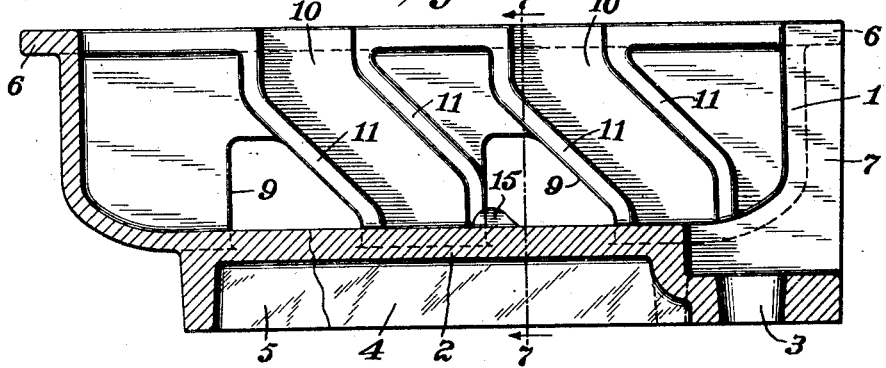
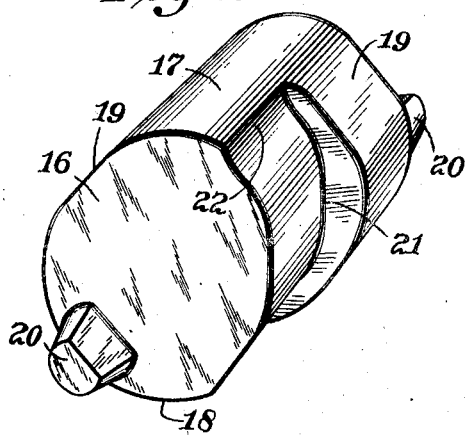
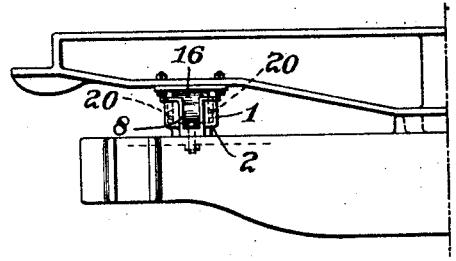
Inventor:
William E. Wine,
by Parker Cook.
Atty.

Patented Jan. 10, 1928.

1,655,486

UNITED STATES PATENT OFFICE.

WILLIAM E. WINE, OF TOLEDO, OHIO.

SIDE BEARING.

Application filed March 15, 1926. Serial No. 94,751.

My invention relates to new and useful improvements in side bearings for freight cars, and has for an object to provide a bearing comprising a housing with self-centering and interlocking rollers. Oftentimes the length of the housing must be limited and by utilizing the arrangement about to be described, the length of the housing may be kept to a minimum.

Still another object of the invention is to provide a side bearing comprising a housing in which there are two self-centering rollers having portions which overlap and interlock at times, but in no way interfere with each other in their shifting movement.

Still another object of the invention is to provide a side bearing having two identical rollers, but oppositely arranged, so that they may interlock at the opposite ends of their travel.

Still another object of the invention is to provide a side bearing formed of a housing and two interlocking rollers, each of said rollers having a portion of one of their faces removed, and each of said rollers being cored on the opposite side of the center of gravity from the cut-away portion so that the roller will center when the load is removed.

Still another object of the invention is to provide a side bearing wherein the rollers have a part of their outer face removed and the opposite side cored so that they will center, to provide further, two small ridges in the base of the housing which cooperate with certain surfaces of the roller to prevent the roller from tilting laterally within the housing when the load is removed from the rollers.

With these and other objects in view, the invention consists in certain new and novel arrangements and combination of parts as will be hereinafter more fully described and pointed out in the claims.

Referring now to the drawings, showing a preferred embodiment of my invention,

Fig. 4 is a longitudinal section taken on line 4—4 of Fig. 1 showing the rollers in their normal and shifted position.

Fig. 5 is a longitudinal section of the casing taken on line 5—5 of Fig. 1, with the rollers removed.

Fig. 8 is a perspective of one of the rollers, and

Fig. 9 is a diagrammatic view showing the bearing in position.

Figure 1:
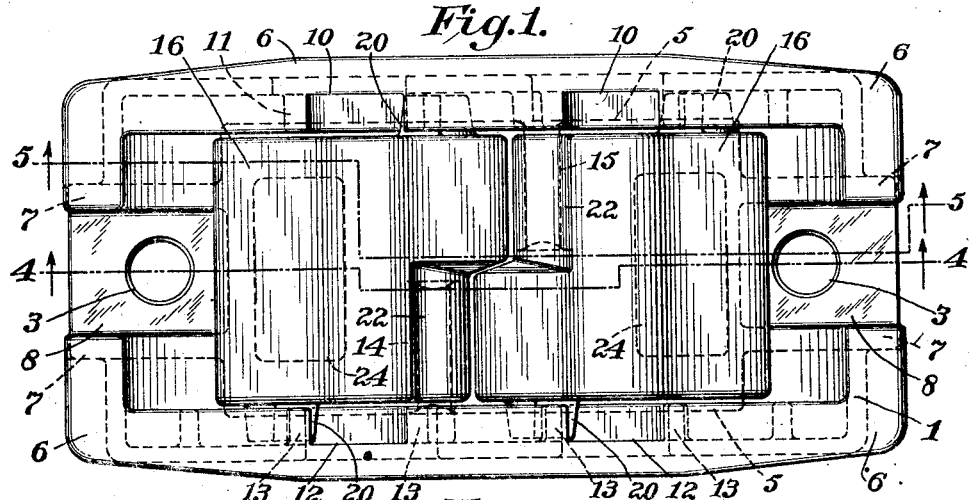
Fig. 1 is a top plan view of my improved side bearing, the rollers being shown in their normal position.

Referring now more particularly to the several views, I have shown a box-like housing 1 having the slightly elevated bottom 2, while the base is provided at each end with the holes 3 for the reception of bolts for fastening the housing to the truck or body bolster. The bottom elevated wall 2 is provided with a central longitudinal rib 4, to strengthen the same, and prevent it from sagging, and likewise a rib 5 is shown extending along the base of the housing and at each side of the center rib, so that three distinct ribs support the housing and rollers.

Figure 3:
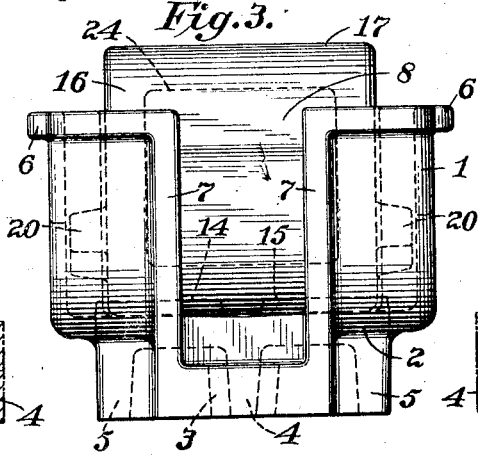
Fig. 3 is an end view.
Figure 7:
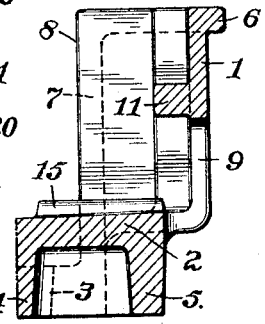
Fig. 7 is a transverse section of the other half of the casing taken on line 7—7 of Fig. 5.

The housing also has the flanges 6 along its upper edge and these flanges merge with the spaced flanges 7 at each end of the housing, there being an open space 8 at the opposite ends of the housing as may be seen in Figs. 1 and 3.

Figure 2:
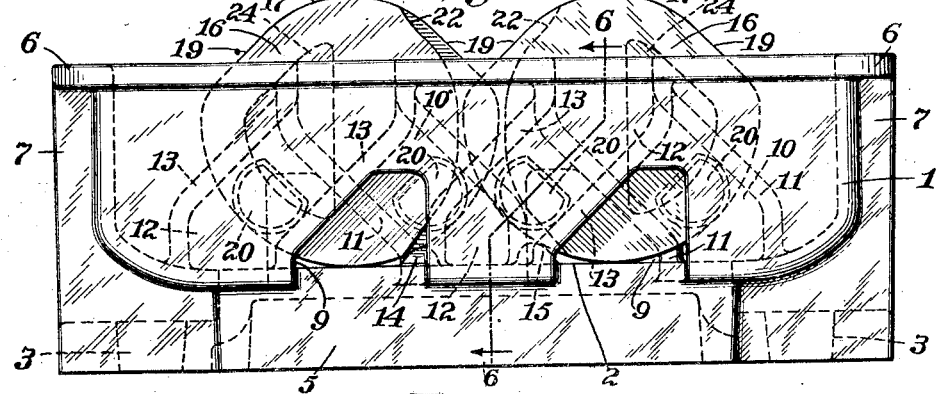
Fig. 2 is a side elevation, the troughs and trunnions being shown in dotted lines.
Figure 6:
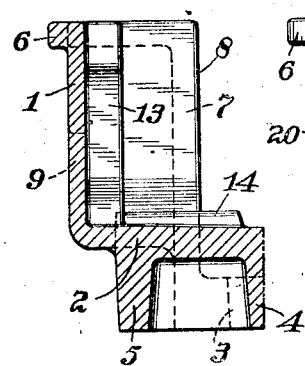
Fig. 6 is a transverse section of one half of the casing taken on line 6—6 of Fig. 2.

As may be seen in Fig. 2, two openings 9 occur in each side of the housing near the center and just above the bottom wall 2 so that if any dirt or foreign matter gets into the box-like housing, it may work out through these openings 9 formed in the opposite sides of the housing. One of the side walls of the housing is provided with the two tracks or guideways 10 for the roller trunnions, shortly to be described, formed by the ribs 11, and the opposite side wall of the housing is provided with similar guideways 12 formed by the ribs 13, but in this instance, the guideways extend in a direction opposite to the guideways 10.

Formed on the upper surface of the bottom 2 are the two laterally extending lugs 14 and 15, one extending from one of the side walls towards the center of the housing and the other extending from the other side wall toward the center, these lugs cooperating with rollers 16 to prevent them from tilting as will be also shortly described.

As far as the specification has proceeded, it will be seen that the housing is provided with a raised bottom wall on which the rollers will bear, and which in turn is strengthened by a plurality of ribs. Furthermore the end walls have openings therein, and the side walls are also provided with openings, so that any dirt may work out of the housing. The inner surfaces of the side wall are provided with ribs which form guideways for the trunnions of the roller bearings, and two transverse lugs are provided on the upper surface of the bottom wall for steadying the rollers.

Referring now more particularly to the rollers 16, it might be mentioned that one is a counterpart of the other, so that a description of the one will suffice.

The roller in its general outline is of the well known "Wine" type, having the rounded apex 17, the base 18 struck on a larger arc than the apex, and the flat faces 19 which merge with the arcs of the apex and base. On the opposite sides of the roller are shown the trunnions 20 adapted to fit within the guideways 10 and 12.

So that the rollers will not interfere with each other when housed in such a relatively short space, and so that there will be an interlocking action between the two rollers, when the rollers are at their either extreme of travel, I cut a portion off of the roller starting near the top of one of the flat sides 19 and about centrally of the length, this cutout portion thus being the deepest at the point 21, while at 22 the cutout portion is slightly concaved, as may be seen in the several views, and this concavity bears and locks against the bottom of the preceding roller as may be seen at the point 23 when the rollers are at their extreme limit of travel (Fig. 4).

It is to be remembered that each roller is of the same outline and shape, but they are oppositely disposed within the housing so the sides of the rollers overlap at their adjacent edges as shown in the dotted lines, Fig. 2.

Referring again to the rollers, it will be understood by glancing at Fig. 8, that inasmuch as a part of the metal is removed from one of the faces of the same, the roller would be heavier on one side than the other and would not be self-centering unless some metal is removed from the other side of the roller to counterbalance the lightened side. I, therefore, form a core 24 in the roller, as may be clearly seen in Fig. 4, the core being diametrically opposite the lightened side, thus permitting it to center itself when there is no load on the roller.

The rollers are placed in the housing by inserting trunnions in the oppositely arranged guideways and turning the rollers slightly as they are inserted, so that the same will come to rest on the floor of the housing.

They will then appear as shown in Figs. 1, 2 and 4, having their edges at one side overlapping. This overlapping in itself makes it possible to use a shorter housing than would otherwise be the case.

The rollers are not free to rock or shift in either direction and in Fig. 4 I have shown them as shifting to the left, and when they reach their limit of travel, they will interlock and rest against each other, the concave portion of one roller bearing against the bottom arc of the preceding roller (see dot and dash lines).

The lugs 14 and 15 on the opposite sides of the housing contact with the respective cut away walls of the rollers and thus steady the rollers. As the rollers revolve, the lugs will still bear against the faces of the rollers, but there is no great load on the lug as the cut out portion widens as it extends toward the center of the roller, and in this manner permits the roller to contact with the lugs and at the same time the load will be directed to the bottom plate of the housing.

The rollers will be tightly interlocked at either end of their travel and will remain this way until the curve in the track has been passed, after which the rollers will unlock and self-center themselves.

From the foregoing it will be seen that I have provided a heavy duty side bearing wherein two self-centering, interlocking rollers are used which may be positioned in a housing of minimum length. The rollers are counterparts, but oppositely disposed, and although a portion of the face of each roller is removed, it is properly counterbalanced by coring a pocket opposite to the side which has a part of its face removed. Means are also provided for a bearing against the cut-away face of the roller, to prevent the roller from tilting endwise within the housing. Lastly, a great amount of frictional surface is obtained in a housing of relatively short length.

Many slight changes might be made without in any way departing from the spirit and scope of the invention.

Having thus described my invention, what I claim as new and desire to secure by Letters Patent is:—

1. A side bearing comprising a housing, self-centering non-tapering rollers within said housing, said rollers provided with overlapping portions on their peripheral faces and said rollers capable of interlocking when at their either extremity of travel.

2. A side bearing comprising a housing, self-centering rollers within said housing, each of said rollers having a portion removed from its peripheral surface, the rollers being identical and oppositely disposed and intermeshing, and said rollers travelling in a straight path and capable of an interlocking relation when at their either extreme limit of travel.

3. A side bearing comprising a housing, two cylindrical rollers of the self-centering type, each of said rollers having a portion removed from its peripheral surface, said cutaway portion extending approximately one-half of the length of the roller, a portion of the roller having a concaved surface near its apex adapted to interlock with a portion of the preceding roller when the said rollers have reached their extreme limit of travel within the casing.

4. A side bearing comprising a cylindrical roller of the self-centering type, having a portion of one of its outer peripheral faces removed, and said roller being internally cored opposite the lightened face to thereby counterbalance the roller.

5. A cylindrical roller for a side bearing of the self-centering type having a portion removed from its outer peripheral faces, the cut away portion extending approximately half the length of the roller and from a point near the apex to a point near the base, and the bottom wall formed by the cut out portion being slightly concaved near its apex.

6. A roller for a side bearing of the self-centering type having the apex 17, base 18, the flat sides 19, the trunnions 20, the cut away portion 21, the concave portion 22 and the cored portion 24.

7. A side bearing comprising a housing, two cylindrical self-centering rollers within the housing and each of said rollers having a portion of its circumferential face removed to leave a convex surface and the rollers being transposed with relation to each other so that the protruding and respective cut away portions overlap and intermesh when in their normal position, and the said rollers being so housed that they are contacting and interlocking when they reach either of their extremities of travel within the housing.

8. A side bearing comprising a housing, box-like in cross section, the sides having openings formed therein, ribs arranged in opposite directions along the opposite sides to form guideways, self-centering rollers having trunnions fitting within said guideways, said rollers having certain portions removed so that an edge of one roller overlaps an edge of the other roller, each of said rollers being slightly concaved near its apex, so that the said rollers will interlock one with the other when at their either extremity of travel.

9. A side bearing comprising a housing, box-like in cross section, said housing having openings in its opposite sides, the end walls each provided with an opening, two transversely extending ribs on the inner surfaces of the bottom wall of the housing and each extending from an opposite side towards the center, rollers of the self-centering type having a portion of their faces removed, said rollers oppositely arranged so that the adjacent edges overlap, the said transversely extending lugs bearing against certain portions of the rollers to thereby prevent the rollers from tilting laterally within the housing.

10. A side bearing comprising a housing having a raised bottom wall, ribs on said bottom wall for supporting the housing, ribs also formed on the inner surfaces of the side walls of the housing to provide a path for the trunnions of rollers, rollers within the housing having trunnions operating in said guideways, said rollers being of the self-centering type and each having a portion of one of its sides removed, the said rollers each being cored opposite said cut away portion to counterbalance said rollers, means formed in the bottom wall of the housing for cooperating with the cut away portion to prevent the rollers from tilting laterally within said housing.

In testimony whereof I affix my signature.

WILLIAM E. WINE.